United States Patent [19]

Fukuda

[11] Patent Number: 5,765,114
[45] Date of Patent: Jun. 9, 1998

[54] COMMUNICATION APPARATUS WITH REDUCED REDUNDANT DATA RECEIPT AND METHOD FOR RECEIVING DATA

[75] Inventor: Fumiyo Fukuda, Hyogo, Japan

[73] Assignee: Mitsubishi Denki Kabushiki Kaisha, Tokyo, Japan

[21] Appl. No.: 389,802

[22] Filed: Feb. 16, 1995

[30] Foreign Application Priority Data

Mar. 23, 1994 [JP] Japan ................................. 6-052044

[51] Int. Cl.$^6$ .................................................. H04B 1/16
[52] U.S. Cl. ................................................ 455/574; 455/343
[58] Field of Search ........................... 455/38.1, 38.3, 455/343, 574, 422, 517, 524; 340/825.44; 371/69.1

[56] References Cited

U.S. PATENT DOCUMENTS

| | | | |
|---|---|---|---|
| 4,908,828 | 3/1990 | Tikalsky | 371/69.1 |
| 5,265,270 | 11/1993 | Stengel et al. | 455/343 |
| 5,293,639 | 3/1994 | Wilson et al. | 455/343 |
| 5,406,613 | 4/1995 | Peponides et al. | 455/343 |
| 5,542,117 | 7/1996 | Hendricks et al. | 455/38.1 |

FOREIGN PATENT DOCUMENTS

| | | |
|---|---|---|
| 60-62746 | 4/1985 | Japan . |
| 2206231 | 8/1990 | Japan . |
| 4196833 | 7/1992 | Japan . |

OTHER PUBLICATIONS

"Mobile Station—Land Station Compatibility Specification", EIA/TIA Standard, Electronic Industries Association, Sep. 1989, pp. Cover, 1–1–1–4, 2–1 – 2–32, 3–1 – 3–22, 4–1 – 4–9, 5–1 – 5–3, 6–1 – 6–3.

*Primary Examiner*—Edward F. Urban
*Attorney, Agent, or Firm*—Rothwell, Figg, Ernst & Kurz

[57] ABSTRACT

A mobile radio communication apparatus achieves a reduction in power consumption by intermittent reception of data. A main receiver, signal strength detector and a receiving processor are turned on at predefined timing intervals. Data received by the main receiver is analyzed by the processor to determine if the received data is intended for the apparatus. If the received data is not directed to the mobile communication apparatus, power to the main receiver is turned off by a power controller until the next predefined timing interval.

10 Claims, 19 Drawing Sheets

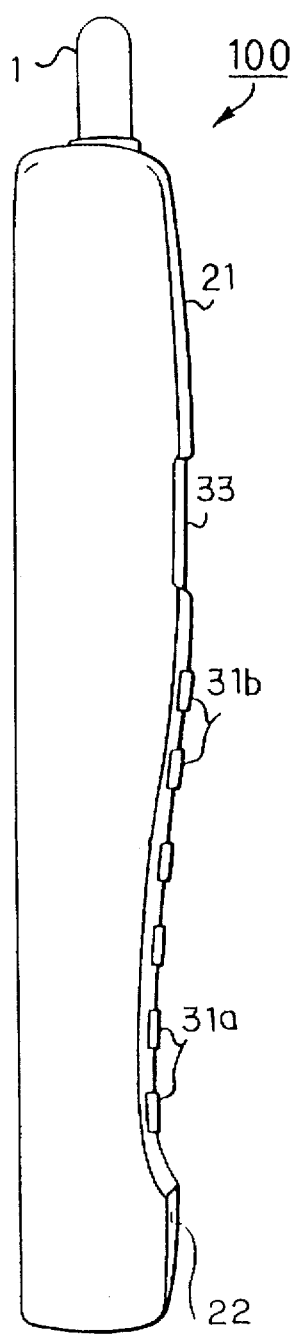
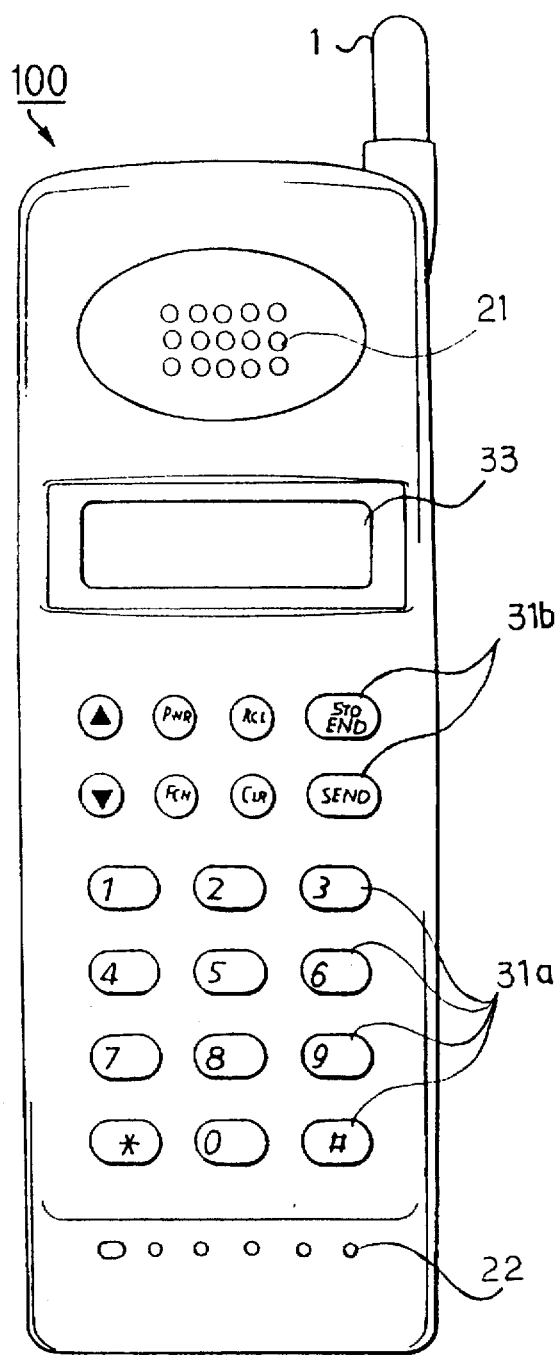
Fig.1 (a)  Fig.1 (b)

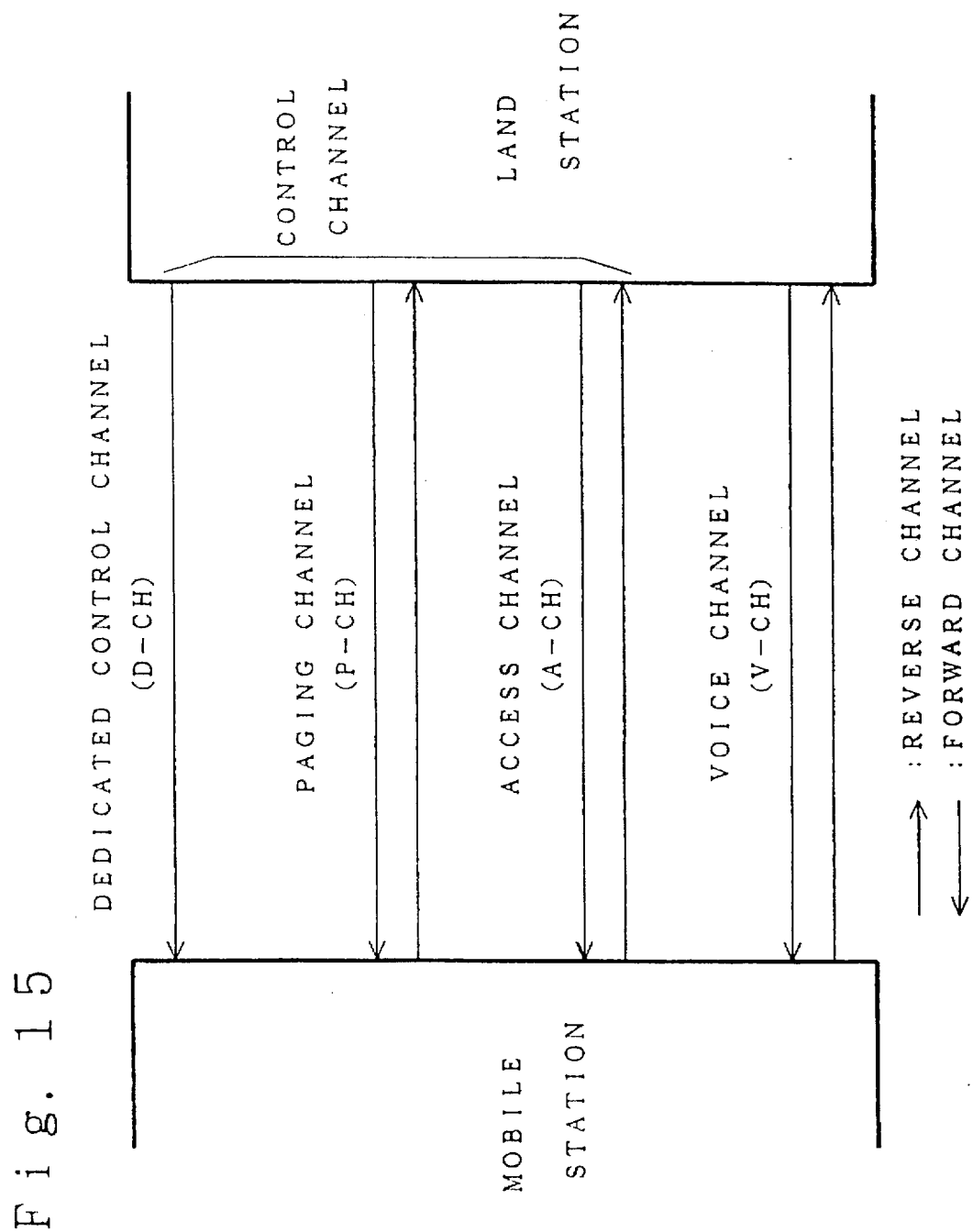

Fig. 16    CHANNEL NUMBERS AND FREQUENCIES

| System | MHz | Number of Channels | Boundary Channel Number | Transmitter Frequency, MHz —Mobile— | Center MHz —Land— |
|---|---|---|---|---|---|
| (Not used) |  | 1 | (999) | (824.010) | (869.010) |
| A" | 1 | 33 | 991 | 824.040 | 869.040 |
|  |  |  | 1023 | 825.000 | 870.000 |
| A | 10 | 333 | 1 | 825.030 | 870.030 |
|  |  |  | 333 | 834.990 | 879.990 |
| B | 10 | 333 | 334 | 835.020 | 880.020 |
|  |  |  | 666 | 844.980 | 889.980 |
| A' | 1.5 | 50 | 667 | 845.010 | 890.010 |
|  |  |  | 716 | 846.480 | 891.480 |
| B' | 2.5 | 83 | 717 | 846.510 | 891.510 |
|  |  |  | 799 | 848.970 | 893.970 |

Fig. 17

| Transmitter | Channel Number | Center Frequency MHz |
|---|---|---|
| Mobile | $1 \leq N \leq 799$ | $0.03N + 825.000$ |
| | $990 \leq N \leq 1023$ | $0.03(N-1023) + 825.000$ |
| Land | $1 \leq N \leq 799$ | $0.03N + 870.000$ |
| | $990 \leq N \leq 1023$ | $0.03(N-1023) + 870.000$ |

Fig. 18

| W1 | A1 | B1 | A2 | B2 | A3 | B3 | A4 | B4 | A5 | B5 |

11

COMMUNICATION APPARATUS WITH REDUCED REDUNDANT DATA RECEIPT AND METHOD FOR RECEIVING DATA

BACKGROUND OF THE INVENTION

1. Field of the Invention

This invention relates to a receiver such as a mobile station and a receiving method for receiving intermittent data in a mobile communication system.

2. Description of the Related Art

Generally, in a mobile communication system such as a mobile phone system, a plurality of land stations is arranged in a control zone as a service area. The mobile station communicates with the plurality of land stations. For starting communication, the mobile station monitors control channels sent from the land station, and identifies a mobile station number on the control channels. If the number matches its own number, the mobile station responds to the call. Otherwise, the mobile station ignores the call. Each mobile station scans a plurality of control channels independently to select the strongest signal control channels. Then, the mobile station executes the task of receiving control signals through the strongest signal control channel.

A radio communication system for mobile or cellular telephones typically uses control channels for transmitting or receiving control signals and voice channels for transmitting and receiving voice signals. Specific channels from among a plurality of channels are used as control channels. For example, in the United States, forty-two channels among six hundred and sixty-six channels are used as control channels and the other channels are used as voice channels. In Japan, forty-one channels among six hundred channels are used as control channels and the others are used as voice channels.

FIG. 15 illustrates a channel configuration of a radio communication system shown in Electronics Information and Communication handbook, page 2188, Institute of Electronics, Information and Communication Engineers, ed., 1988.

As shown in FIG. 15, the control channels consist of three types of channels: dedicated control channels (D-CH), paging channels (P-CH), and access channels (A-CH). The dedicated control channels are used for transmitting mobile station identification numbers and for identification of paging channels, access channels, and voice channels to be used by the mobile station. The paging channels are used for broadcast calls to the mobile station. The access channels are used for initiating a call from the mobile station to a land station and for responding to a call from the land station.

The dedicated control channels are one way channels from the land station to the mobile station. On the other hand, the paging channels and the access channels are two way channels between the land station and the mobile station. And, the voice channels of course are also two way channels for two way communication between the mobile station and the land station.

FIG. 16 illustrates relationships between channels and center frequencies shown in Mobile Station-Land Station Compatibility Specification EIT/TIA-553. System A consists of channels through 1 to 333. System B consists of channels through 334 to 666. System A', System B', and System A" are optional systems. The number of channels is expandable up to 1023 channels when the options are adapted. Systems A and B have bandwidths of 10 MHz, system A' has a bandwidth of 1.5 MHz, B' 2.5 MHz, and system A" has a bandwidth of 1 MHz.

FIG. 17 illustrates the relationships between the center frequency of each channel and the channel number. As illustrated, the center frequency of each channel can be calculated from the channel number according to a specified formula. As shown in FIG. 16, in the U.S. the mobile radio communication consists of System A and System B. The mobile station thus has to be compatible with both systems. System A and System B each have a separate set of control channels. System A and System B each define the dedicated control channel, the paging channel, the access channel and the voice channel independently.

FIG. 18 illustrates a typical signal stream of control channels. In the figure, a header signal identification 11 heads streams A and B. Data A and B are contained in the streams A and B respectively. Each mobile station is ready for receiving the identifier corresponding to each receiving station. When the corresponding identifier is detected, the call is thereby determined to be directed to the receiving station and communication is started. Otherwise, the call is ignored.

FIG. 19 illustrates a flow-chart of a method for detecting the control channels to be used for a conventional mobile station. This method can be commonly adopted for detecting the dedicated control channels, the paging channels, and the access channels. In FIG. 19, the bandwidth of the System is scanned at step 1 to examine received electric field strength on every channel. At step 2, the mobile station tunes to the channel having the strongest electric field strength in the examined bandwidth. At step 3a, the mobile station judges whether data has been received on the tuned channel. At step 4a, the mobile station judges whether a predefined time period has passed during which no data has been received. When the predefined time period has expired, the mobile station tunes to the channel having the second strongest electric field strength at step 5. Then, at step 3b, it judges whether data has been received on the tuned second strongest channel. At step 4b, the mobile station judges whether a predefined time period has elapsed during which no data has been received. The mobile station analyzes the received data at step 6.

When the mobile station has judged that data has been received, it completes the process of detecting the control channels and analyzes the received data at step 6. When it has not received the data within the predefined time, it ends the process of detection of the control channels. Then, the scan process is started again.

In operation, the control channel signal is sometimes interrupted or changes when disturbances such as noise occur during the transmission or when the mobile station is far away from the land station. As a result, in such cases the mobile station may be unable to receive the data correctly. In order to prevent the reliability from declining due to the data error, for example, in a mobile telecommunications system in the United States (EIA/TIA IS 54B), the received data are recognized to be those related to a receiving station only after the control channel signals are received five times consecutively. Furthermore, the received data related to a receiving station are recognized according to a majority, by comparing the reliability of each bit at every receipt of the received data. Thus, the reliability is prevented from declining due to noise, disturbances and other such factors in the received data.

A conventional mobile telecommunications system is configured as has been described. Namely, data are received a plural number of times to prevent the reliability from declining. Since the received data related to the receiving station are recognized based on data received a plural number of times, a relatively long time is required to complete the task of recognition. Accordingly, the consumption of electric power is inevitably increased.

SUMMARY OF THE INVENTION

This invention solves the foregoing problems so as to provide an intermittent data receiver and receiving method which reduce the consumption of electric power by recognizing the received data from the land station corresponding to the receiving station in a short time.

According to one aspect of this invention, a communication apparatus includes a receiver for receiving incoming data which are repeatedly transmitted for a predefined number of times, and a main controller for checking whether the incoming data relates to the receiving communication apparatus with a fewer number of data receipts than the predefined number of times.

The communication apparatus further includes a power controller which controls the distribution of power based on the checking result of the main controller.

In the communication apparatus, the receiver includes a word receiver for detecting a word from the incoming data and main receiver for identifying repeated words, and the power controller restricts the distribution of power to the main receiver when the checking result shows that the incoming data does not relate to the receiving communication apparatus.

In the communication apparatus, the main controller also includes a signal strength detector for detecting a signal strength of the incoming data and identifying means for identifying the content of the incoming data with a lesser number of repeated data receipts than the predefined number of times according to the signal strength detected by the signal strength detector.

In the communication apparatus, the main controller also includes an error handler for detecting a transmission error of the incoming data, and identifying means for identifying the content of the incoming data with a lesser number of repeated data receipts than the predefined number of times according to a detection of the transmission error by the error handler.

In the communication apparatus, the main controller further includes a signal strength detector for detecting a signal strength of the incoming data, an error handler for detecting a transmission error of the incoming data, and identifying means for identifying a content of the incoming data with a lesser number of repeated data receipts than the predefined number of times according to both the signal strength and the detection of the transmission error.

According to another aspect of this invention, the communication method for the communication apparatus includes the steps of starting to receive a predefined number of repeated data receipts, measuring the signal strength of the received data and identifying that the received data is for the receiving communication apparatus before receiving all of the predefined number of repeated data receipts if the received signal strength is stronger than a predefined strength.

The communication method for the communication apparatus also includes the steps of detecting a transmission error of the received data and identifying that the received data is for the receiving communication apparatus before receiving all of the predefined number of repeated data receipts if a transmission error is not detected.

The communication method for the communication apparatus further includes the steps of measuring a signal strength of the received data, detecting a transmission error of the received data, and identifying that the received data is for the receiving communication apparatus before receiving all of the predefined number of repeated data receipts if the signal strength is stronger than a predefined strength and the transmission error is not detected.

BRIEF DESCRIPTION OF THE DRAWINGS

FIG. 1(a) is a side view of a mobile station according to one embodiment of the present invention;

FIG. 1(b) is a front view of the mobile station according to one embodiment of the present invention;

FIG. 15 illustrates a configuration of a conventional radio communication protocol;

FIG. 16 illustrates the relationship between channels and center frequency for conventional protocols;

FIG. 17 illustrates the relationship between channel number and center frequency for conventional protocols;

FIG. 18 illustrates a format of the transmitted and received signal of control channels for conventional protocols.

DESCRIPTION OF THE PREFERRED EMBODIMENTS

Figure 2:
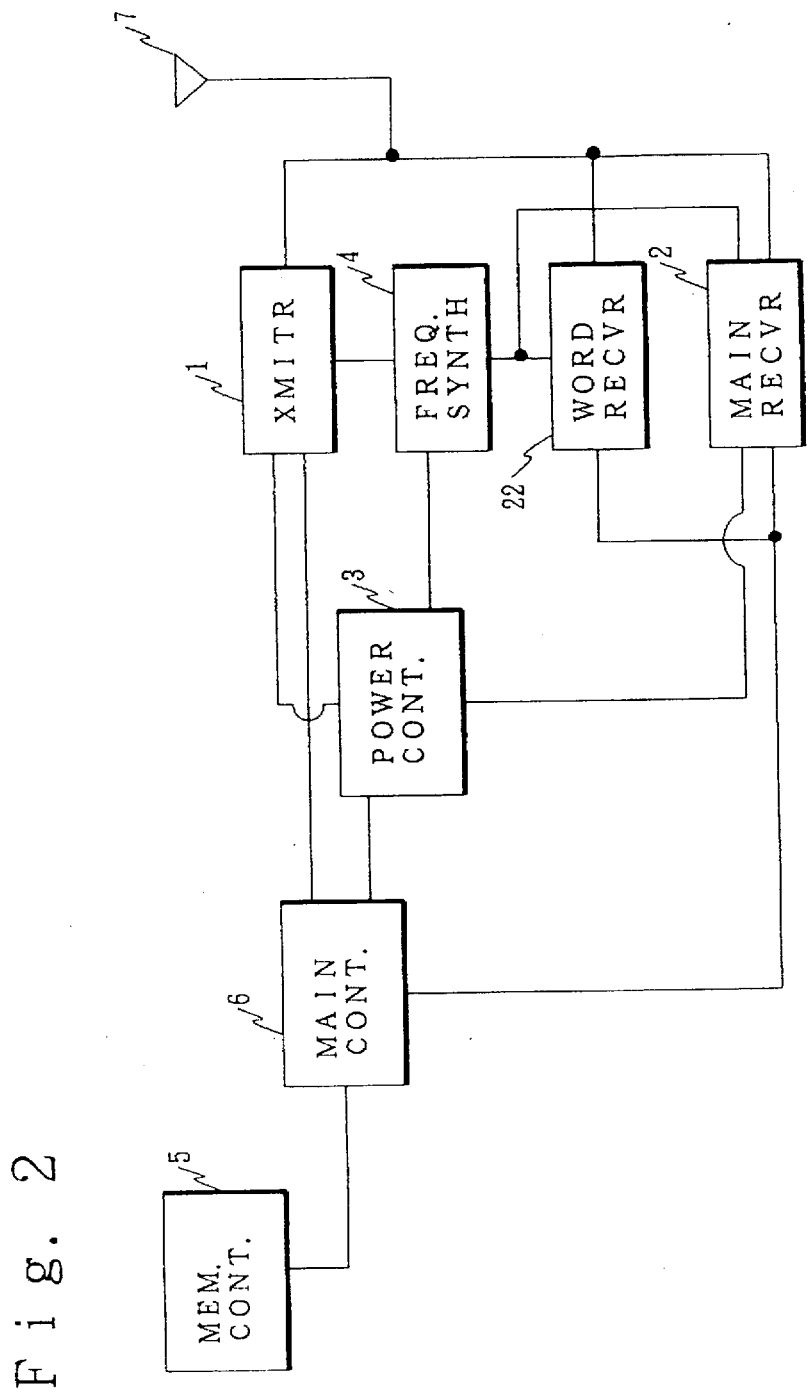
FIG. 2 is a block diagram of a mobile station of one of embodiment based on the present invention.

Embodiment 1.

The following is a description of a configuration and the operation of an intermittent data receiver according to one embodiment of the present invention, with reference to the attached figures.

FIGS. 1(a) and 1(b) illustrate a mobile station of an intermittent receiving apparatus according to a first embodiment of this invention. A mobile station 100 is a portable mobile radio telephone. The mobile station 100 has an antenna 1 to transmit and receive an electric wave signal, a receiver 21 and a transmitter 22. Further, it has dial keys 31a to dial and function keys 31b. And, it has a display 33 to indicate alphanumeric characters and symbols.

FIG. 2 is a block diagram illustrating the intermittent data receiver. In FIG. 2, the intermittent data receiver contains a transmitter 1, a main receiver 2, a word receiver 22 and a power controller 3. Further, it contains a frequency synthesizer 4, a memory controller 5, a main controller 6 and an antenna 7.

Figure 3:
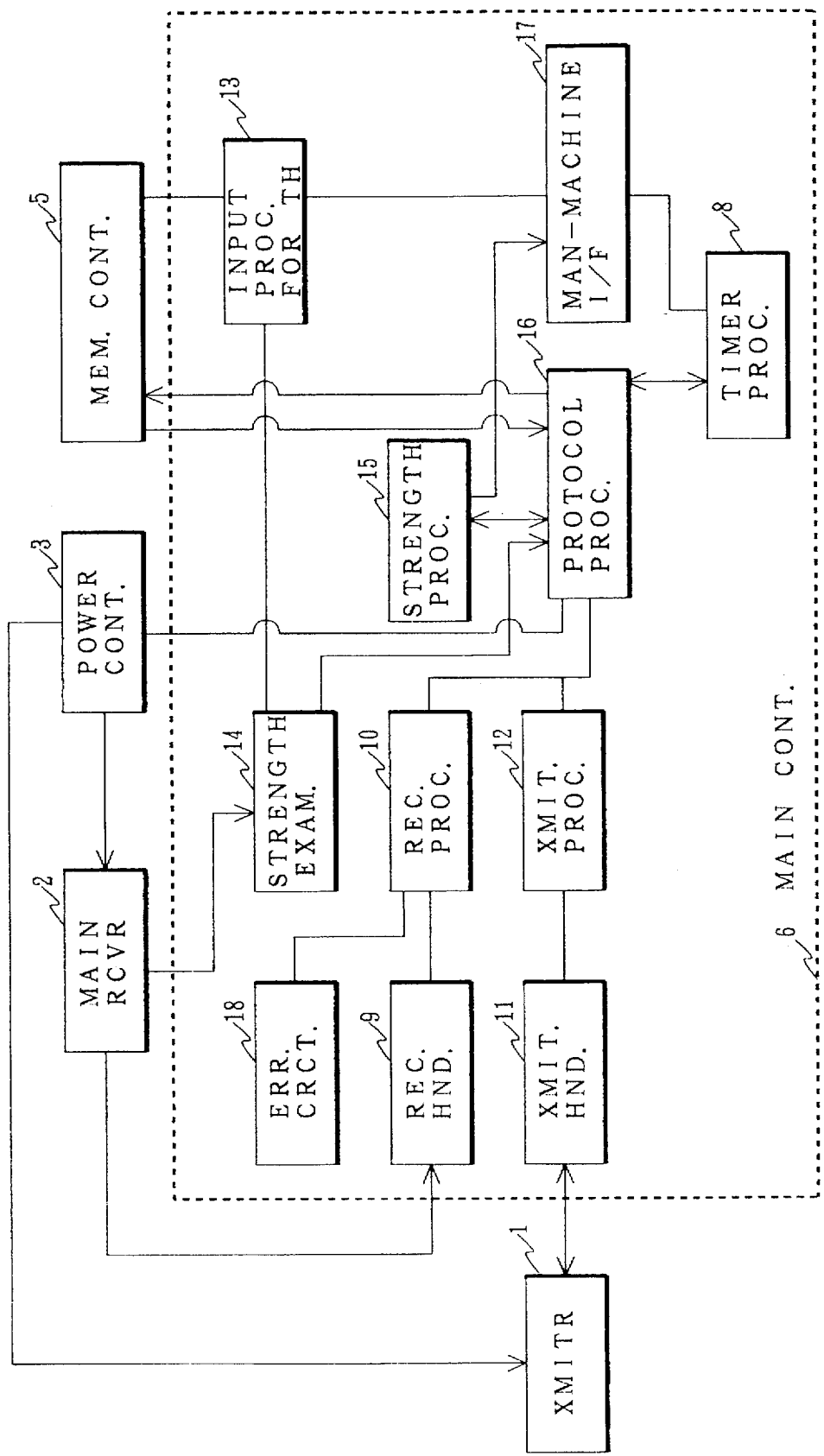
FIG. 3 is a detailed block diagram of the controller shown in FIG. 2.

FIG. 3 illustrates the detailed configuration of the main controller 6 shown in FIG. 2. In FIG. 3, a timer processor 8, a receiving handler 9, a receiving processor 10, a transmitting handler 11, and a transmitting processor 12 are included. In addition, a predefined electric field strength, i.e., a threshold level is determined by an input processor 13 for threshold based on input from a strength examiner 14 which examines the electric field strength of the actual received data sent from the receiver. Further, a strength processor 15, a protocol processor 16, and a man-machine interface 17 are included. The operation of the main controller 6 of FIG. 3 will be described in further detail below.

Figure 4:
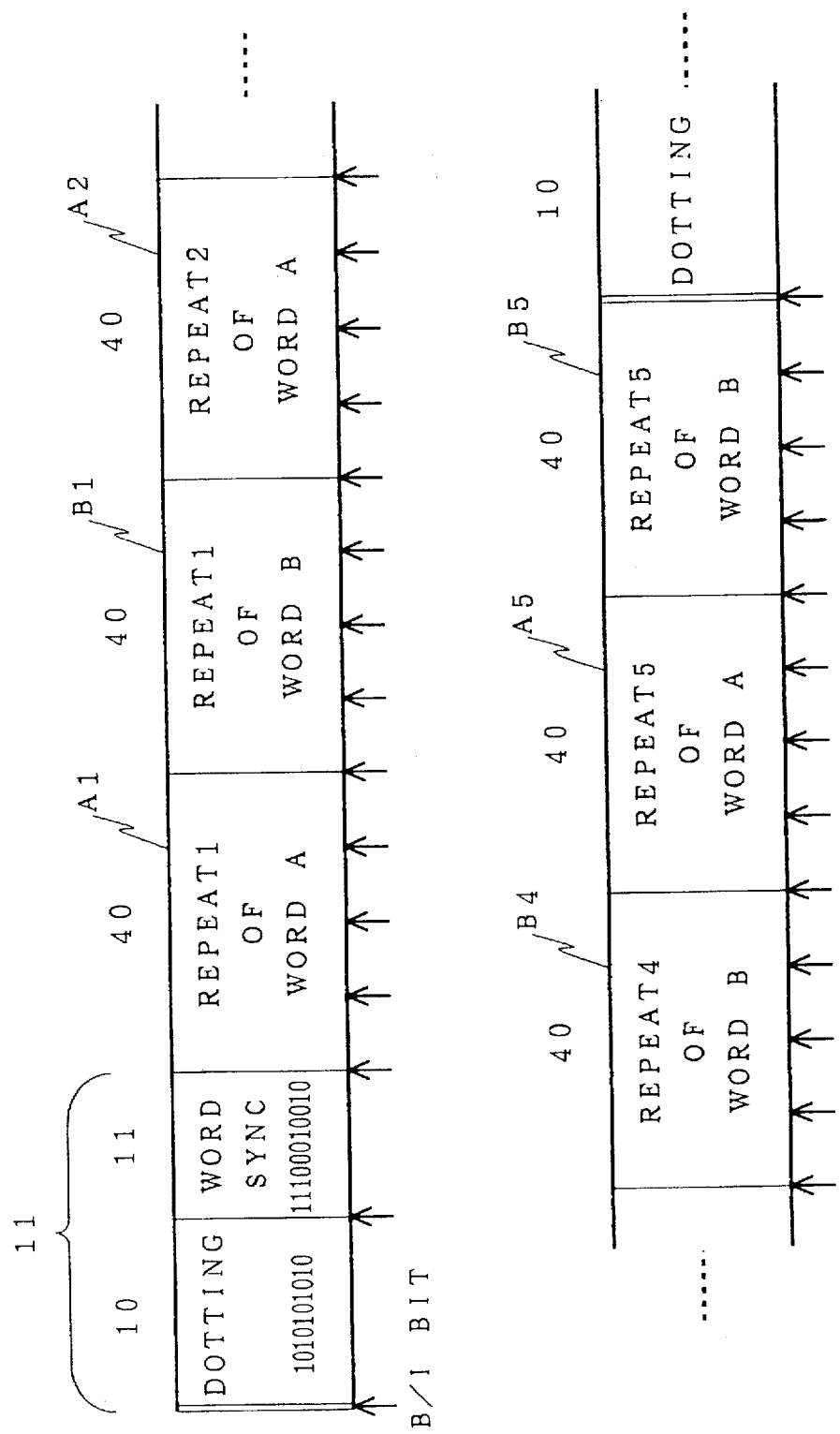
FIG. 4 is a view illustrating a forward control channel massage stream (Land-to-Mobile)
Figure 18:
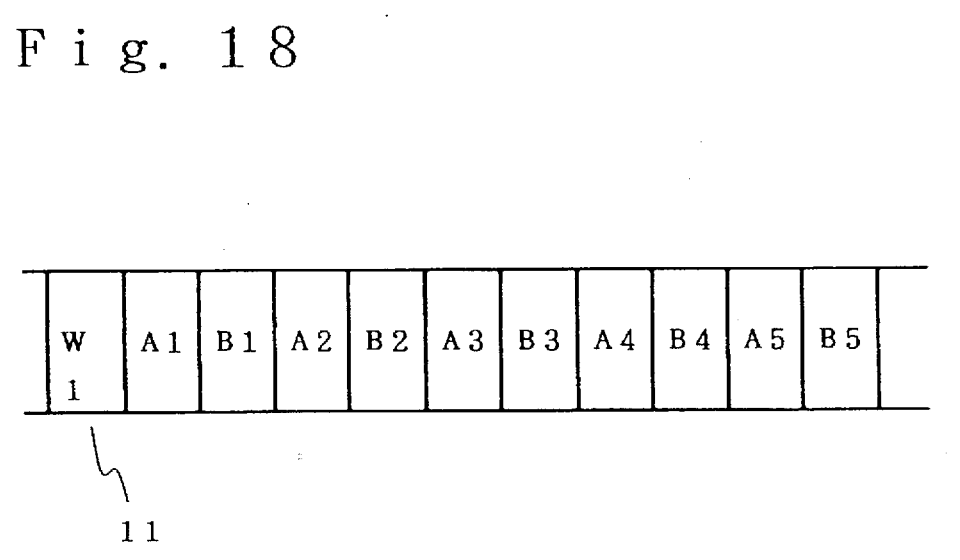

FIG. 4 is a detailed view of the data stream shown in FIG. 18, which is illustrated in EIA/TIA 553, p. 3–10. It illustrates a data stream on the Forward Control Channel (FOCC) sent from the land station. In FIG. 4, an identifier 11 indicates a head of the stream. Stream A is for system A and has words A1, A2, A3, A4 and A5. Stream B is for system B and also has words B1, B2, B3, B4 and B5.

There follows below an explanation of the data stream illustrated in FIG. 4, referring to the description of the EIA/TIA 553, p. 3–10 through 3–11.

The forward control channel (FOCC) is a continuous wideband data stream sent from the land station to the mobile station. This data stream must be generated at a 10 kilobit/second±0.1 bit/second rate. FIG. 4 depicts the format of the FOCC data stream.

Each forward control channel consists of three discrete information streams, called stream A, stream B, and busy-idle stream, that are time-multiplexed together. Messages to mobile stations with the least significant bit of their mobile identification number equal to '0' are sent on stream A, and those with the least-significant bit of their mobile identification number equal to '1' are sent on stream B.

The busy-idle stream contains busy-idle bits, which are used to indicate the current status of the reverse control channel. The reverse control channel is busy if the busy-idle bit is equal to '0' and idle if the busy-idle bit is equal to '1'. A busy-idle bit is located at the beginning of each dotting sequence, at the beginning of each word sync sequence, at the beginning of the first repeat of word A, and after every 10 message bits thereafter.

A 10-bit dotting sequence (1010101010) and an 11 bit word sync sequence (11100010010) are sent to permit mobile stations to achieve synchronization with the incoming data. Each word contains 40 bits, including parity, and is repeated five times; it is then referred to as a word block. For a multi-word message, the second word block and subsequent word blocks are formed the same as the first word block including the 10-bit dotting and 11-bit word sync sequences. A word is formed by encoding 28 content bits into a (40, 28) BCH code that has a distance of 5, (40, 28; 5). The left-most bit (i.e. earliest in time) shall be designated the most-significant bit. The most significant bits of the 40-bit field shall be the content bits.

The generator polynomial for the (40, 28; 5) BCH code is:

$$g_B(x) = X^{12} + X^{10} + X^8 + X^5 + X^4 + X^3 + X^0$$

The code, a shortened version of the primitive (63, 51; 5) BCH code, is a systematic linear block code with the leading bit as the most significant information bit and the least-significant bit as the last parity-check bit.

Each FOCC message can consist of one or more words. The types of messages to be transmitted over the forward control channel are:

Mobile station control message

Overhead message

Control-Filler message

Control-filler messages may be inserted between messages and between word blocks of a multi-word message.

Figure 5:
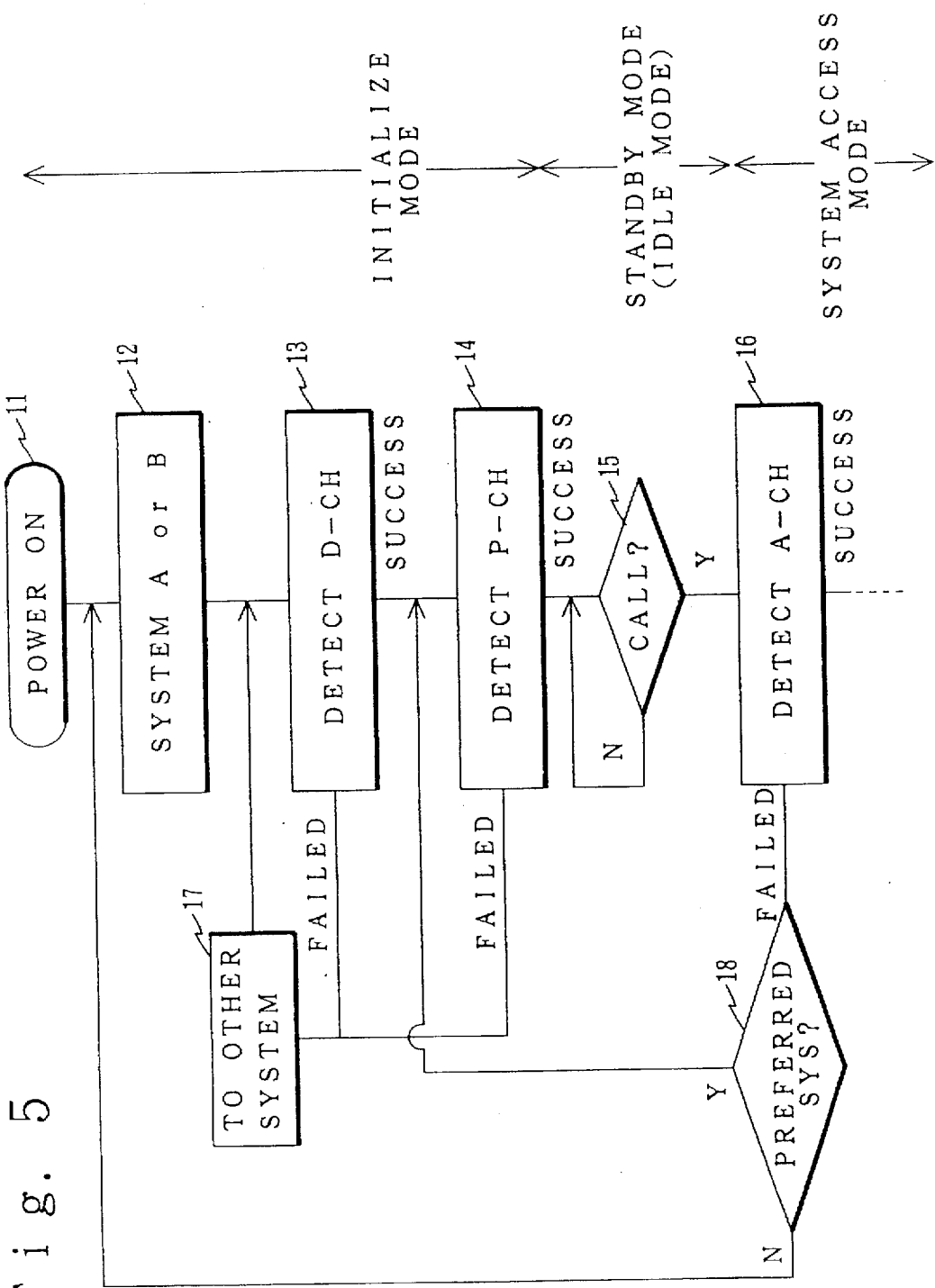
FIG. 5 is a flow-chart of operation of the mobile station according to the present invention.

FIG. 5 is a flow-chart of the operation of the protocol processor 16 when the power is applied to the mobile station. At step 11, the power is applied to the mobile station. At step 12, the value of the preferred system set in advance is checked to see which system, the System A or the System B, the mobile station should adapt itself to. At step 13, the mobile station carries out the process of detecting a dedicated control channel. When it succeeds in detecting the dedicated control channel, the following actions take place based on the information received from the land station through the detected dedicated control channel.

(1) setting of the system identification SIDS (2) setting of the number of paging channels N (3) setting of the first paging channel (4) setting of the last paging channel At step 14, the mobile station carries out the process of detecting a paging channel. When the mobile station succeeds in detecting the paging channel, it enters an idle status. During the idle status, the following values are set according to the information received from the land station through the detected paging channel.

(1) setting of the paging/access integrated bit CPA (2) setting of the number of access channels CMAX (3) setting of the first access channel (4) setting of the last access channel As shown at step 15, when a call is requested during the idle status, the mobile station carries out the process of detecting an access channel at step 16. When the mobile station succeeds in detecting the access channel, it enters an access status with the land station.

When the mobile station fails to detect control channels, the above mentioned processes are repeated for the other system which has not been checked. For instance, when the mobile station fails to detect the control channels for the System A, it carries out the process of detecting control channels for the System B.

Figure 6:
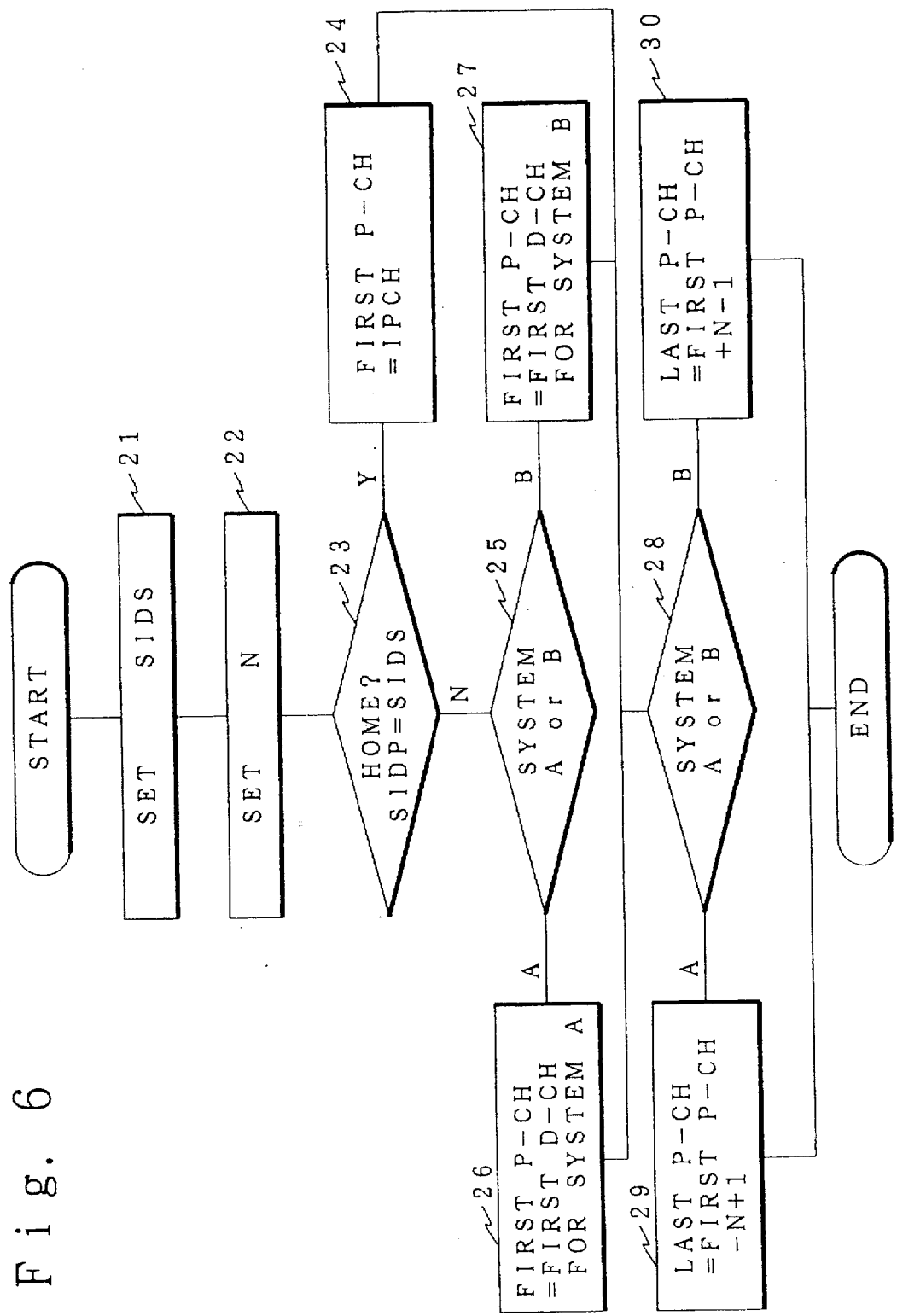
FIG. 6 is a flow-chart of the process of setting the paging channels of the mobile station according to the present invention.

FIG. 6 is a flow-chart explaining a process for setting each value based on information submitted from the land station through the dedicated control channel when the mobile station succeeds in detecting the dedicated control channels at step 13.

First, at step 21, the mobile station stores the system identification SIDS sent from the land station. At step 22, it stores the number of paging channels N received from the land station. Comparing a home system identification SIDP with the received and stored system identification SIDS at step 23, the mobile station determines if it is positioned in its home system. When it is positioned in the home system, at step 24, it sets the initial paging channel as the first paging channel. When the mobile station is not positioned in the home system, it sets the first paging channel according to the preferred system in which it is operating, that is, either the System A or the System B. For either case of the Systems A or B, the mobile station sets the first dedicated control channel among the dedicated control channels assigned for each system as the first paging channel.

At step 28, the mobile station checks the preferred system again. At steps 29 and 30, it sets the last paging channel according to the system detected as the operating system.

Figure 7:
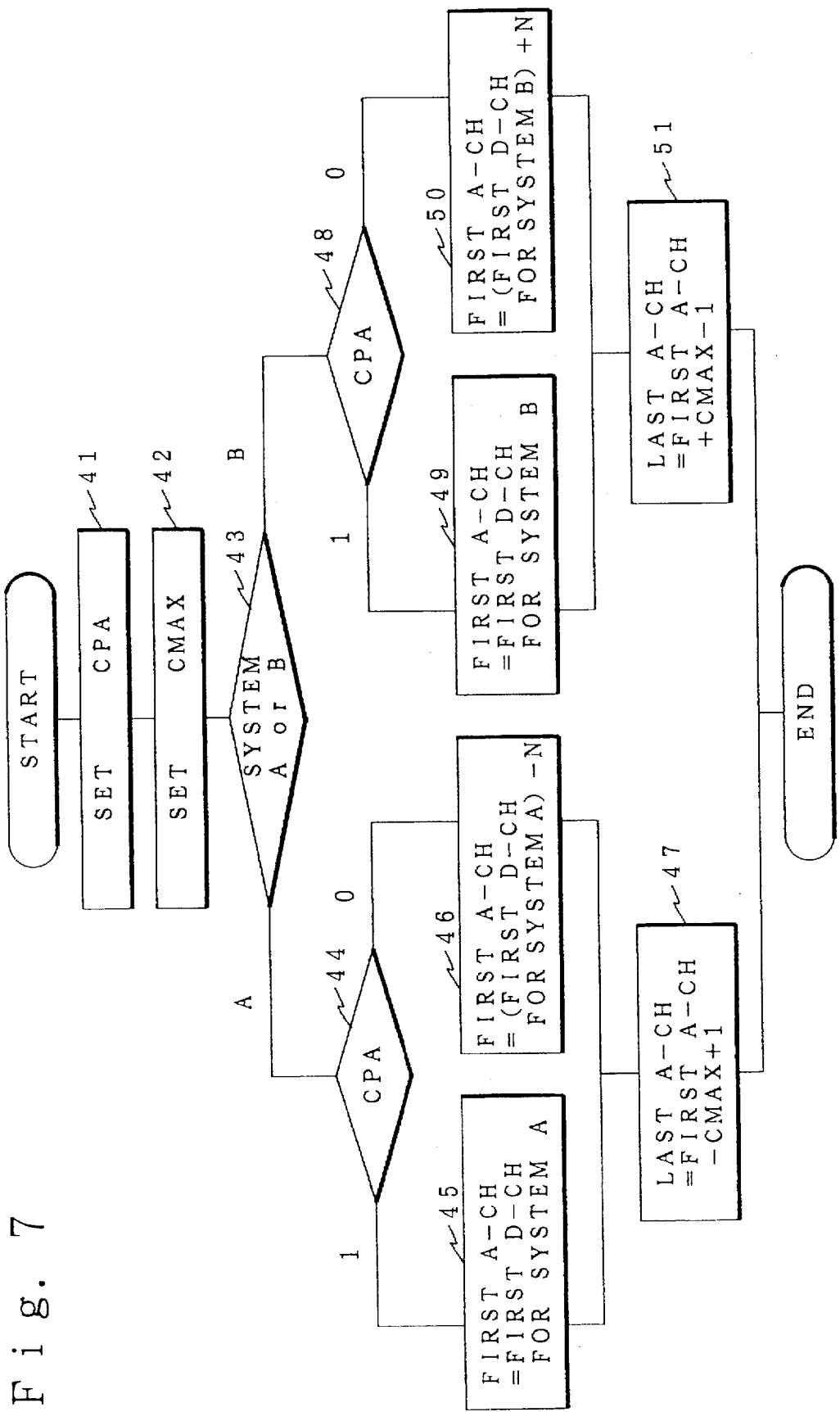
FIG. 7 is a flow-chart of the process of setting the access channels of the mobile station according to the present invention.

FIG. 7 is a flow-chart illustrating the process carried out when the mobile station succeeds in detecting a paging channel.

At Step 41, according to the value received from the land station through the paging channel, the mobile station sets the paging/access integrated bit CPA to indicate if the paging channels and the access channels are identical. At step 42, it sets the access channel number CMAX received from the land station. At step 43, the mobile station checks which system, i.e., the System A or the System B, it should adapt itself to. If the preferred system is System A, the mobile station checks the value of the CPA at step 44. According to the value, at steps 45 and 46, it sets the first access channel. If the value of the CPA equals to 1 at step 44, the first access channel is the same as the first dedicated control channel for the System A. If the value of the CPA equals to 1 at step 48, it is the same for the System B. If the value of the CPA equals to 1, the access channels also serve as the paging channels (or the paging channels also serve as the system dedicated channels). Further, as shown at step 45, the mobile station sets the first dedicated control channel as the first access channel. If the value of the CPA equals to 0, as shown at step 46, the mobile station sets another channel than the first dedicated control channel as the first access channel.

At step 47, the mobile station sets the last access channel based on the number of access channels and the first access channel set at steps 45 or 46.

If the preferred system is the System B, at steps from 48 to 51, the mobile station sets the first access channel and the last access channel based on the same processes for the System A. In the System B, as shown at step 49, the mobile station sets the first dedicated control channel as the first access channel.

The operation of the intermittent data receiver which has the above-mentioned configuration will now be described. The mobile station or intermittent data receiver shown in FIG. 2 usually keeps power of the word receiver 22. On the other hand, it turns on and off the transmitter 1 and the main receiver 2 under the control of the main controller 6. The mobile station receives the control signal shown in FIG. 4 at the word receiver 22 through the antenna 7. The word receiver 22 transfers the signal to the main controller 6.

While the mobile station receives the control channel signal shown in FIG. 4 at the word receiver 22, the mobile station monitors transmission of the system information from the land station, indication of access channels or paging channels, calling to the mobile station and so forth. Each word A1 through A5 and B1 through B5 is a time slot which includes one item of calling information independently. Each word A1 through A5 and B1 through B5 includes the identical data in each of the streams A and B respectively.

Conventionally, a consecutive number of data receipts, for example, five data receipts, are always received to confirm the contents regardless of the condition under which the data are received. That is, the recognition of received data corresponding to the receiving station, in other words, judgement of received data whether they are related to the receiving station or not is executed based upon five data receipts. In the present invention, in an area which has much noise or other disturbances, the reliability of the received data is increased without requiring the full preselected number of data receipts. In areas which have strong electric field strength, if the data are judged to be reliable enough, the recognition of received data is also performed at an early stage and subsequent steps are based on this result. Namely, the electric field strength is examined and the recognition of received data is executed. If the electric field strength is strong enough and the mobile station recognizes the data to be correctly received as those corresponding to the receiving station, the next step is started immediately. If the received data are not recognized to be those corresponding to the receiving station, in other words, if they are recognized to be those related to another mobile station, the power to the main receiver 2 is immediately turned off.

The input processor 13 for threshold inputs the reference electric field strength level, i.e., the threshold to the memory controller 5 through the man-machine interface 17. More specifically, an operator inputs the value with a key board not shown in the figure. Herein, in case of input of the reference electric field strength level, the proper value is determined in advance so as to be adapted to actual operating conditions.

The electric strength examiner 14 examines the electric field strength of the received data according to the status of the received electric wave sent from the word receiver 22 and transmits the result to the protocol processor 16. The protocol processor 16 compares the examined electric field strength to the reference electric field strength level stored in the memory controller 5 and checks the result, working with the strength processor 15. The electric field strength level is transmitted through the input processor 13 for threshold to the protocol processor 16. In case that the examined electric field strength after the comparison is determined to be above the electric field strength level, the received data sent from the word receiver 22 are analyzed. Based on the results, the control signal is sent to the power controller 3 and the power of the main receiver 2 is turned off.

Herein, if the data from the word receiver 22 is recognized to be those corresponding to the receiving station, the receiving process from the main receiver continues with the electric power to the main receiver 2 remaining on.

The majority process of each bit is thus made more effective when it is combined with the process of determining the electric field strength of the signal.

For instance, the probability of each bit causing error in the strong electric field is assumed to be $\frac{1}{10}$. Here, the probability of the error bit being missed in the error correcting procedure is below $(\frac{1}{10})^2$. Namely, the probability of the error remaining through the error correcting procedure is below $(\frac{1}{10})^2$, the probability which is resulted from an error which is missed twice. Therefore, the reliability is adequately high.

Furthermore, the main controller 6 detects the condition of the mobile station. In order to save the power of the transmitter, the main controller 6 turns on and off the power of the transmitter 1 under the control of the power controller 3 based on the detected condition. The timer processor 8 notifies the protocol processor 16 of the predefined time and decides the waiting time ready for receiving data. The protocol processor 16 executes the initialization when the predefined time for judgement of the received data expires.

Figure 8:
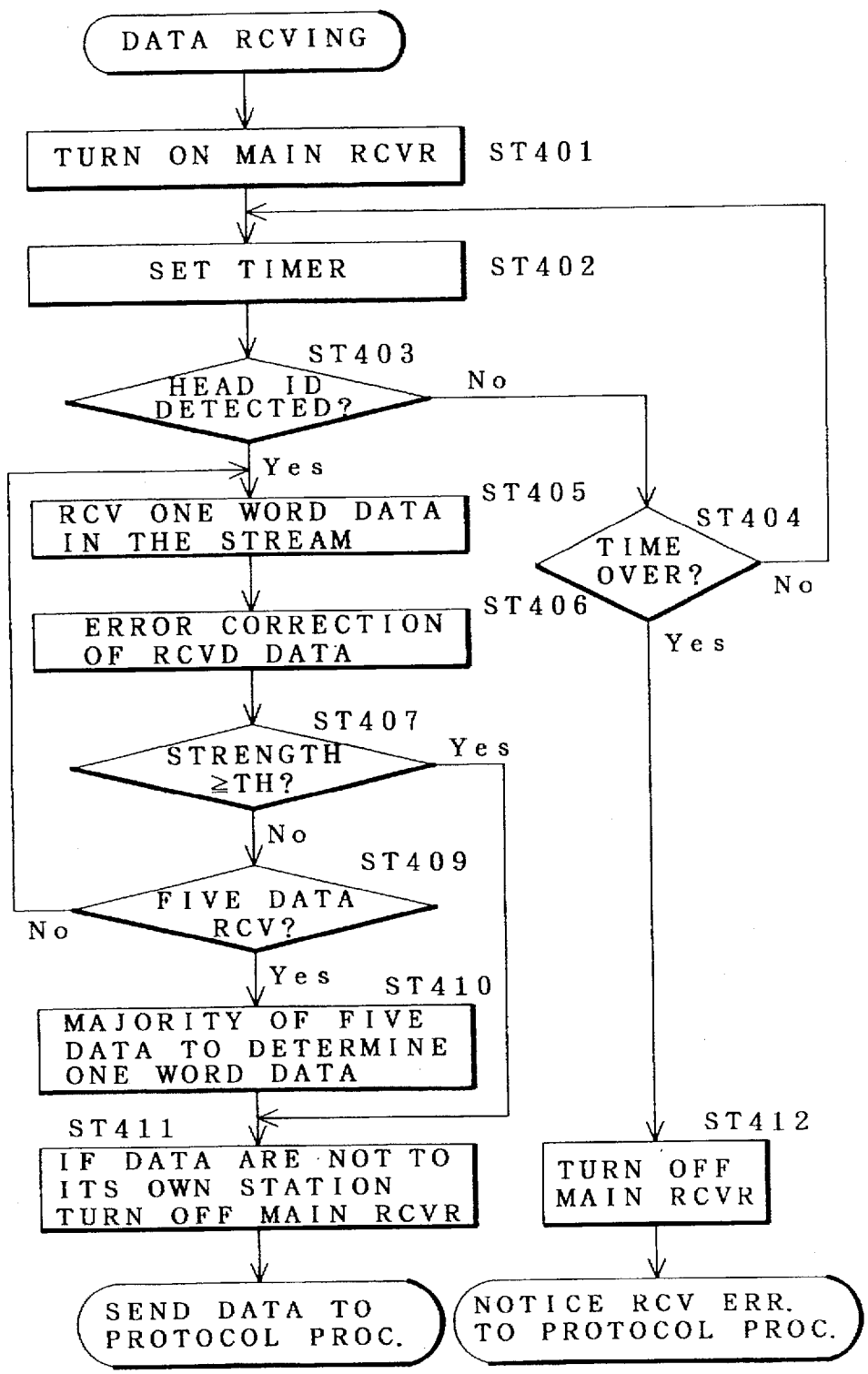
FIG. 8 is a flow-chart illustrating the receiving operation of one embodiment of the present invention.

FIG. 8 is an operation flow-chart illustrating the analysis of received data of the mobile station. In the mobile station shown in FIG. 2, the power is applied to the receiver 2 from the power controller 3 controlled by the main controller 6 to provide a ready state for receiving data.

The operation will now be described. If the mobile station enters a ready state for receiving data, the power of the main receiver 2 is turned on at step ST401. Simultaneously, the timer is set at step ST402. At step ST403, the head identifier 11 on the control channels is detected. At step ST405, the mobile station starts reception of one word of data in the stream in which the mobile station is contained. If an error occurs in the received data, at step 406, an error corrector 18 executes the error correction of the received data. At step ST407, the mobile station detects whether the electric field strength level is above the reference threshold. If the electric field strength is adequately strong, it is judged that data have been received correctly. Further, if the received data are judged to be those not directed to the receiving station, the power of the main receiver is turned off at step ST411 to exit the ready state for receiving data.

If the receiving electric field strength is below the reference threshold, the mobile station examines if the number of received data is counted up to five. Then, according to the contents of the received five data receipts the mobile station judges whether the data are directed to the receiving station.

Here, a time for ending the procedure is set by the timer in advance. At step ST404, in the event that the identifier 11 is not detected and the predefined time set by the timer expires, the power of the main receiver of the mobile station is turned off.

The following are descriptions of the method of detection of data error in the control signal and the use of a majority process. In general, the control channel signal sent from the land station has a capability to cause errors due to the decline of the electric field strength, noise or other disturbances. The stronger the receiving electric field strength, the lower the probability of errors. On the other hand, the weaker the receiving electric field strength, the higher the probability of errors. Accordingly, in one embodiment of the present invention, the received data are judged according to the receiving electric field strength.

Since a mobile station in a mobile communication system receives signals by switching channels sequentially among a plurality of control channels, there is always the possibility of data errors. So, the reliability of the received data needs to be increased. An explanation will be made in connection with a concrete example as set forth below. There is shown a case where the control signals sent from the land station A consist of four bits of data 1111, for instance. If bits of the control signal are interrupted during the transmission to the mobile station, the control signal is possibly received as different signal, for example, 1011 or 1110. Here, the probability of causing errors in the control data is assumed to be ½. In case that these identical control data are received five times, the reliability can be assumed as follows. If the majority of each bit of five control data receipts is adapted, the probability of each bit causing errors reduces to ½×½× ½×½×½=1/32. Thus, if received data are judged according to the majority as to all bits of the four bits, the probability of data error occurring in the received data reduces to 1/32.

In the case where the receiving electric field strength is judged to be below the reference threshold, the mobile station executes the majority process by recognizing the reliability of the received control data to be low. The control data stream, for example the word A1, is temporarily stored in the memory controller 5 and the subsequent word A2 is received at step 409. Then, the same processes are repeated. Thus, the words A1 through A5 are received. Thus, in the case where the receiving electric field strength of the data is lower than the reference threshold, the majority process is executed. Namely, the words A1 through A5 stored in the memory controller 5 are read out respectively and the majority process of each one bit is executed to determine one received data at step ST410.

Embodiment 2.

Figure 9:
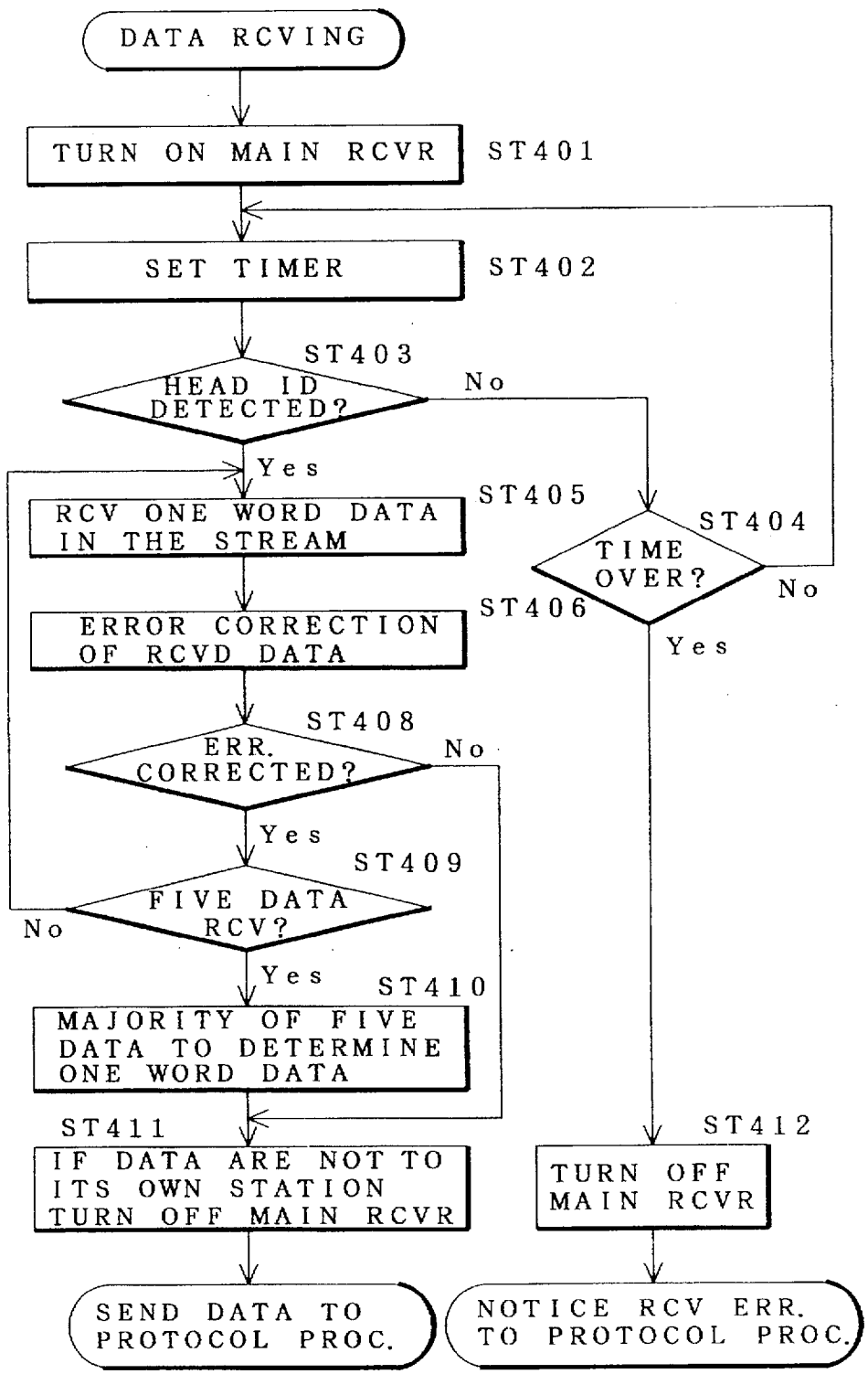
FIG. 9 is a flow-chart illustrating a receiving operation of one embodiment of the present invention.

In the second embodiment, the received data are judged by examining whether error correction of the received data has been executed. The electric field strength is not used in this embodiment. The operation flow-chart of the second embodiment is as shown in FIG. 9. The error corrector 18 (FIG. 3) executes the error correcting coding of the data received by the receiving processor 10 with CRC check, for example. Then, the information as to whether the error correction has been executed or not is transmitted to the protocol processor 16 and the contents of the received data are examined. If the data are judged to be received correctly at step ST408 without executing error correction, the contents of the received data are determined to be correct. As a result, if the analyzed received data are not related to the receiving station, the electric power of the main receiver is turned off as described in Embodiment 1.

Embodiment 3.

Figure 10:
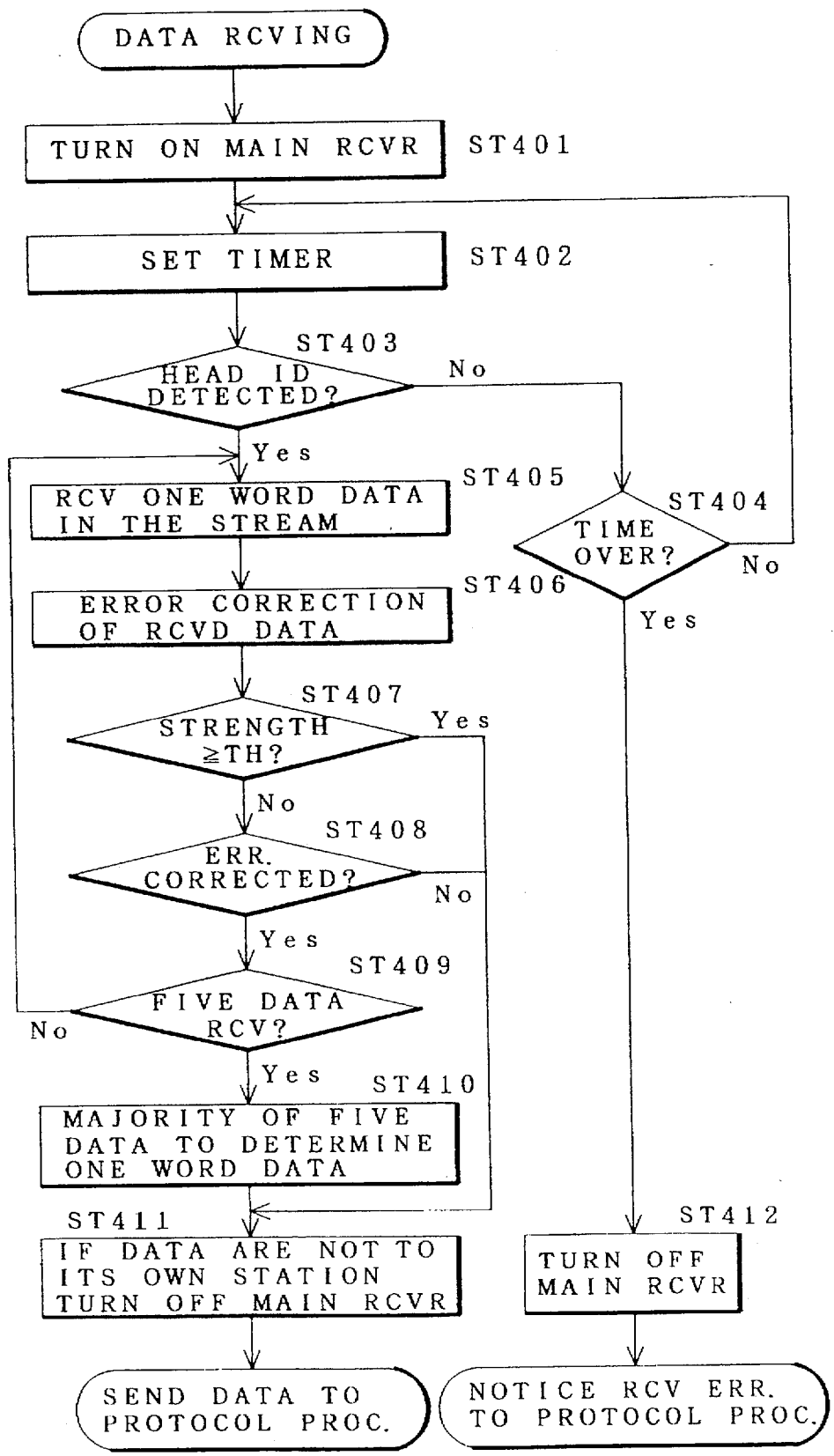
FIG. 10 is a flow-chart illustrating a receiving operation of one embodiment of the present invention.

In the third embodiment, the received data are judged by examining whether the error correcting coding of the received data has been executed and, in addition, by using the electric field strength. In the present embodiment, the operation flow-chart is shown in FIG. 10. The error corrector 18 (FIG. 3) carries out the error correcting coding of the data received by the receiving processor 10 with CRC check, for example. The information whether the error correcting coding is executed or not is transmitted to the protocol processor 16 (FIG. 3). The protocol processor 16 checks the contents of the received data together with the results of the examined electric field strength. Even if the electric field strength is determined at step 407 to be below the reference threshold, that is, even if the electric field strength is determined to be low, it is still possible that the received data can be analyzed as being correct. Namely, if the data are judged at step ST408 to be received correctly without the execution of error correcting coding, the further analysis of the data can be carried out based on the determination at step ST408 that the received data are correct. As a result, if the analyzed received data is not related to the receiving station, the electric power of the main receiver is turned off as described in Embodiment 1.

Embodiment 4.

Figure 11:
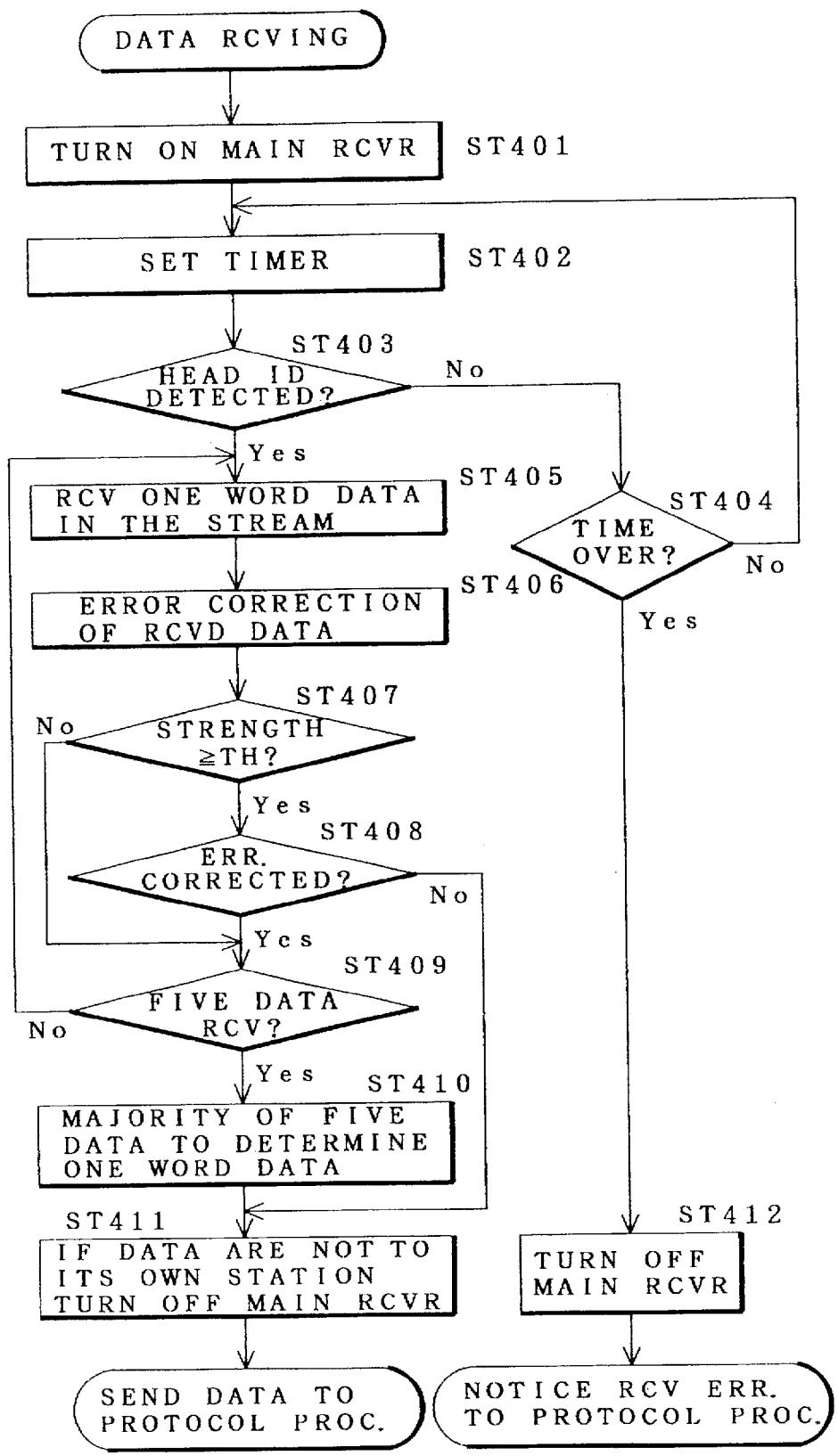
FIG. 11 is a flow-chart illustrating a receiving operation of one embodiment of the present invention.

In the fourth embodiment, the received data are judged by examining whether error correction of the received data has been executed and also by using the electric field strength. In the present embodiment, the operation flow-chart is shown in FIG. 11. The error corrector 18 executes the error correcting coding of the data received by the receiving processor 10 with CRC check, for example. Then, the information as to whether the error correcting coding has been executed or not is sent to the protocol processor 16. The protocol processor 16 checks the contents of the received data together with the result of the examined electric field strength. If the electric field strength is determined to be above the threshold level at step ST 407 and data can be received correctly without executing the error correcting coding at step 408, the received data are analyzed as being correct. As a result, if the analyzed received data are not related to the receiving station, the electric power of the main receiver is turned off as described in Embodiment 1.

Embodiment 5.

Figure 12:
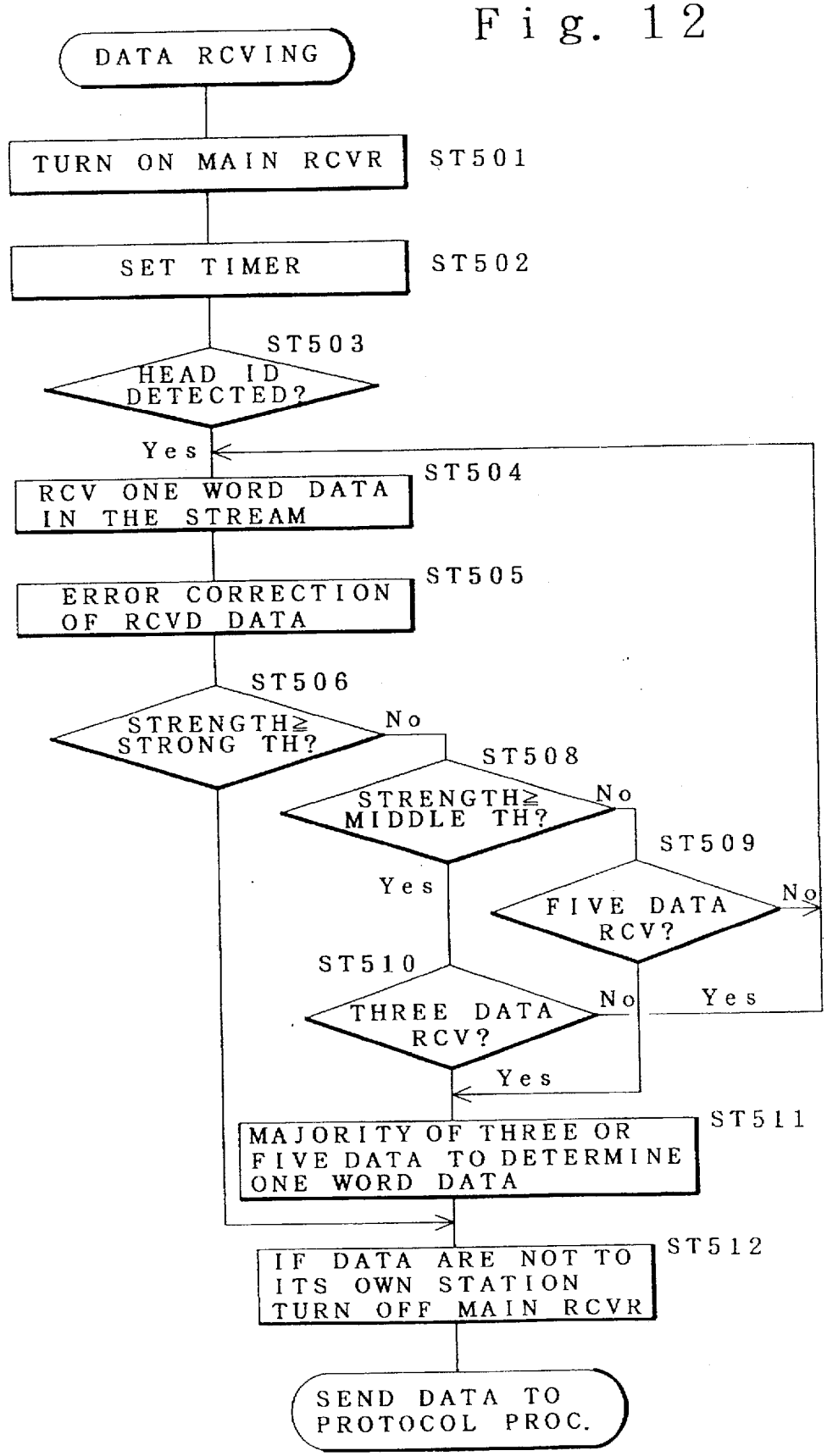
FIG. 12 is a flow-chart illustrating a receiving operation of another embodiment of the present invention.

FIG. 12 is a flow-chart illustrating the operation of the mobile station of another embodiment. In Embodiments 1 through 4, there is only one reference level of electric field strength for checking the reliability of the received data. As has been described, the reliability of the data depends on the electric field strength. In the fifth embodiment, it is possible to determine the received data by dividing electric field strength into plural reference levels and varying the subsequent steps.

In the operating flow-chart in FIG. 12, the reference electric field strength is divided into three reference electric field strengths according to three levels: strong electric field strength, middle electric field strength and weak electric field strength. The correspondence with each divided electric field strength reference level decides the subsequent steps. Namely, at step ST 506, it is judged whether the electric field strength of the received signal is above the predefined strong reference electric field strength, in other words, the strong reference threshold. Then, the contents are examined immediately according to the received data.

On the other hand, when the field strength is less than the strong reference level but greater than the middle reference electric field, three data are received and the judgement process is carried out according to the three data receipts. In this case, the received data are determined based on the majority of each content bit of the three data receipts in the same manner as has been described.

For example, in the case of data at the strength of the middle electric field, the probability of causing errors is assumed to be ¼. In this case, according to the three times of reception, the probability reduces to $(¼)^3=1/64$. Thus, as a function of the level of the electric field strength of the received data, the number of data receipts used to determine the majority can be increased or decreased. The stronger the electric field strength, the fewer the number of times of data receipts. That is, it is possible to obtain the results in a shorter time with increasing electric field strength.

Further, at step ST509, the process of receiving data at the weak electric field reference level is assumed to be executed. In areas having such a weak electric wave, five data are received as shown at step ST509. And, according to the contents of the received five data receipts, the mobile station determines whether or not the received data are directed to the receiving station.

Since the remaining operations of the flow-chart are similar to those of preceding embodiments, a detail explanation of such remaining steps will be omitted. As has been described above, it is possible to reduce the time for judgement of the received data without deteriorating the reliability and to reduce the consumption of electric power of the receiver by examining the electric field strength in comparison to the different reference levels.

Figure 13:
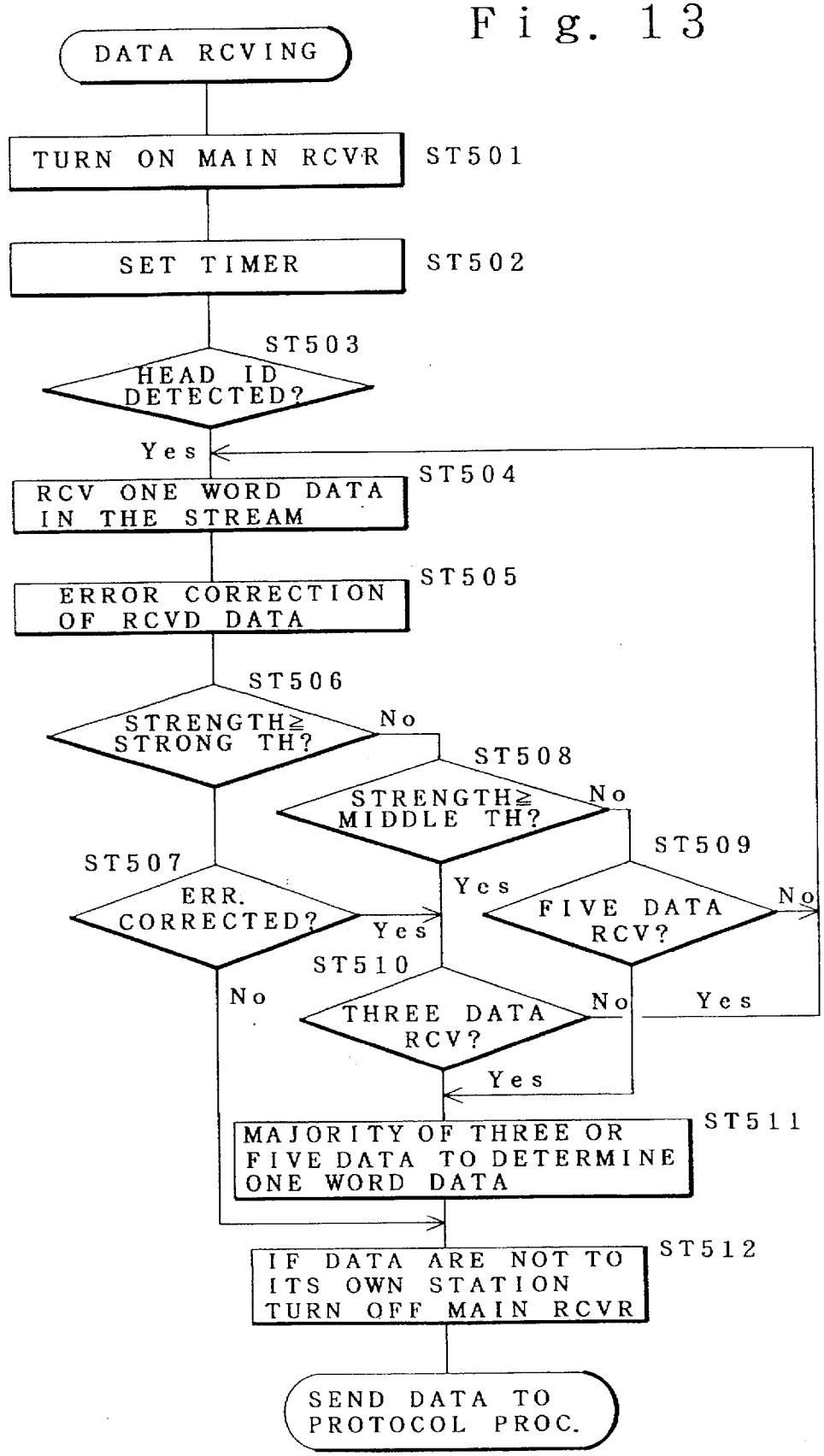
FIG. 13 is a flow-chart illustrating a receiving operation of another embodiment of the present invention.

FIG. 13 includes a step based on error correction which is shown as step ST507 and which is in addition to the steps shown in the flow-chart of FIG. 12.

Embodiment 6.

In the sixth embodiment, most of the main controller 6 is configured by a general microprocessor. The same functions as in Embodiment 1 will be performed.

Figure 14:
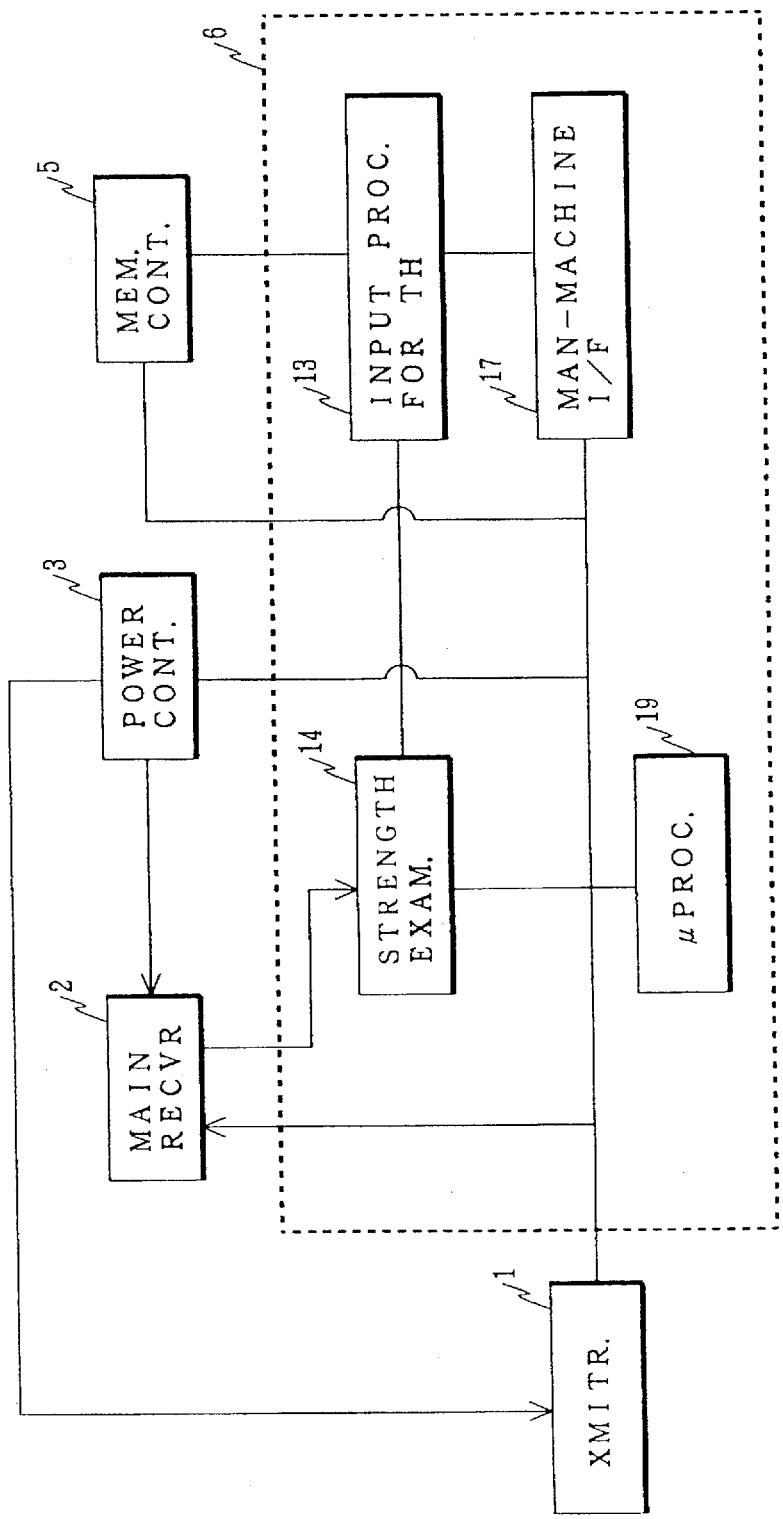
FIG. 14 illustrates a configuration of a controller of a mobile station of another embodiment of the present invention.
Figure 19:
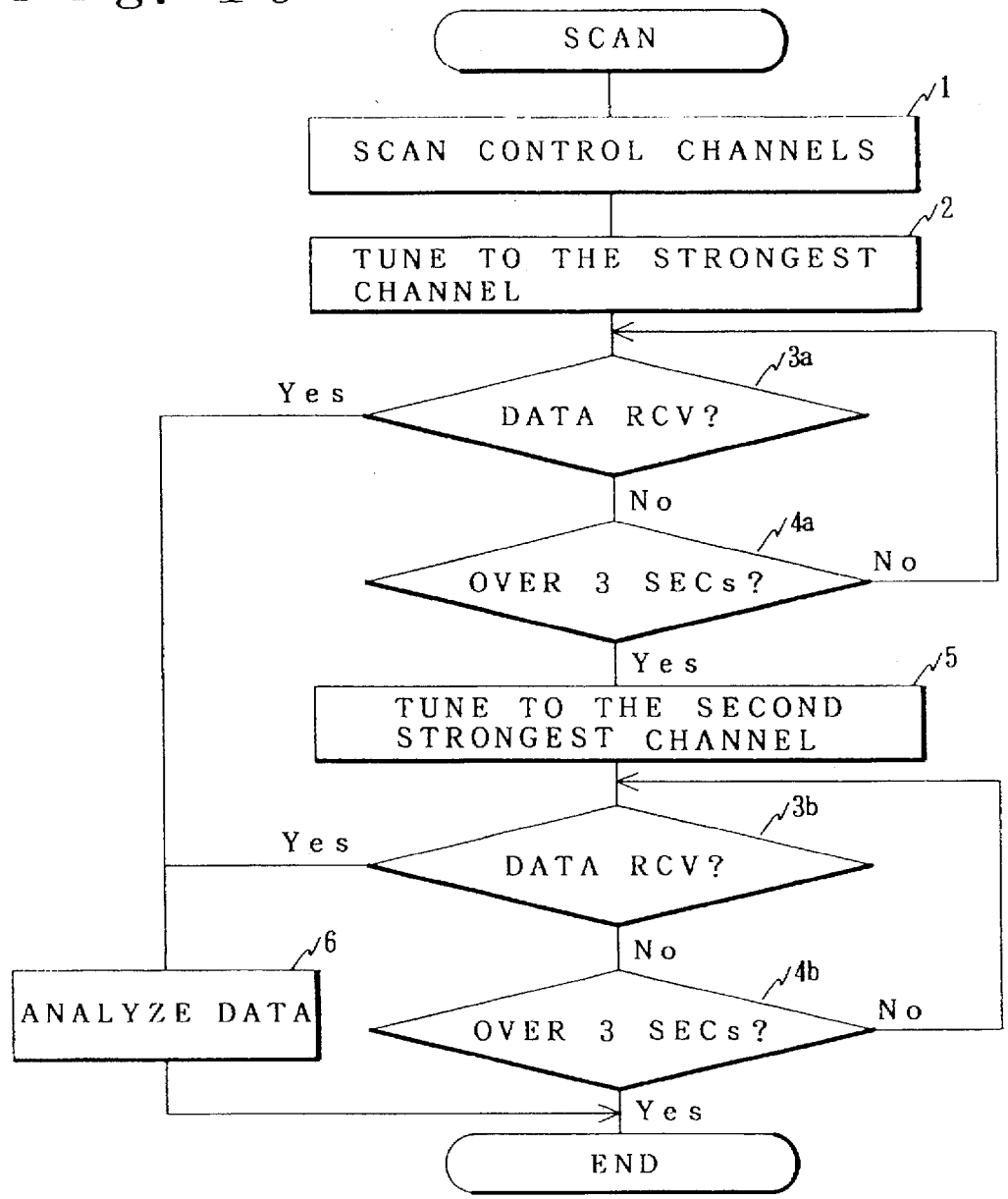
FIG. 19 is a flow-chart of a conventional method which detects the control channels.

FIG. 14 is a detailed configuration of the main controller 6 of the mobile station according to the sixth embodiment. In this embodiment, a microprocessor 19 is included. Further, the elements numbered the same as those shown in FIG. 2 perform the same functions as described in FIG. 2.

The microprocessor 19 executes each procedure as described in FIGS. 8 through 13 according to the programs previously stored. More specifically, the microprocessor 19 executes each of the operations of the receiving handler 9, the receiving processor 10, the transmitting processor 12, the strength processor 15, the protocol processor 16 and the error corrector 18, as described in flow-charts of FIGS. 8 through 13.

Generally, in a step for processing control signal, it takes a few microseconds for processing. If the number of steps is about twenty, the time for processing can be ignored, comparing to the waiting time for receiving data. On the other hand, the transmission speed of the control signal transmitted from the land station is about a few milliseconds. In comparison with the processing speed of the main controller 6, this is rather slow. Thus, the microprocessor 19 can complete the process of receiving data in adequate time.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A communication apparatus comprising:

a receiver for receiving incoming data which are repeatedly transmitted a predefined number of times for multiple redundant receipt and comparison of the received data so as to attain an enhanced reliability of the accurate receipt of such data;

a main controller having means for determining whether the data is directed to the communication apparatus utilizing a fewer number of data receipts than said predefined number of times without substantial deterioration in the enhanced reliability by applying at least one selected control parameter to the incoming data to determine the accuracy thereof and for processing the data if the same is determined to be accurate, and a power controller for controlling the distribution of power to the communication apparatus in response to the processing of the data, wherein the receiver includes a word receiver for detecting a word in the incoming data and a main receiver for identifying repeated words, and wherein the power controller restricts the distribution of power to the main receiver when the processing of the data indicates that the data are not directed to the communication apparatus, wherein the main controller includes a signal strength detector for detecting a signal strength of the incoming data;

an error handler for detecting a transmission error of the incoming data;

identifying means for identifying the content of the incoming data with a lesser number of repeated data receipts than the predefined number of times according to the signal strength, and wherein the identifying means uses a different number of times to identify the contents of the incoming data according to the signal strength.

2. The communication apparatus of claim 1, wherein the signal strength detector detects an electric field strength.

3. The communication apparatus of claim 1, wherein the error handler corrects the transmission error.

4. The communication apparatus of claim 1, wherein the identifying means identifies the content of the incoming data with a lesser number of repeated data receipts than the predefined number of times when the signal strength is stronger than a prestored strength and the transmission error is not detected.

5. The communication apparatus of claim 1, wherein the identifying means identifies the content of the incoming data with a lesser number of repeated data receipts than the predefined number of times when the signal strength is weaker than a prestored strength and the transmission error is not detected.

6. The communication apparatus of claim 1, wherein the identifying means identifies the content of the incoming data with the first received data.

7. The communication apparatus of claim 1, wherein the identifying means identifies the content of the incoming data with the majority based on the odd number of repeated data receipts.

8. The communication apparatus of claim 1, wherein the communication apparatus is a mobile station.

9. The communication apparatus of claim 1, wherein the communication apparatus is a cellular phone.

10. The communication apparatus of claim 1, wherein the communication apparatus is a portable unit.

* * * * *